United States Patent [19]
Tufts et al.

[11] 3,975,914
[45] Aug. 24, 1976

[54] IMPLOSION ENGINE

[76] Inventors: Robert J. Tufts, P.O. Box 3088; Albert S. Christopher, 4667 Telegraph Road, both of Ventura, Calif. 93003

[22] Filed: Nov. 15, 1974

[21] Appl. No.: 524,078

[52] U.S. Cl. ................................. 60/673; 60/511
[51] Int. Cl.² .................... F01K 25/10; F01K 25/06
[58] Field of Search .................. 60/39.46, 645, 649, 60/673, 509, 511, 512, 672

[56] References Cited
UNITED STATES PATENTS

| | | | |
|---|---|---|---|
| 399,131 | 3/1889 | Campbell | 60/645 |
| 427,401 | 5/1890 | Campbell | 60/673 |
| 2,902,980 | 7/1959 | Barrett | 418/266 |
| 3,505,810 | 4/1970 | Mamiya | 60/673 |

FOREIGN PATENTS OR APPLICATIONS

| | | | |
|---|---|---|---|
| 294,882 | 9/1929 | United Kingdom | 60/673 |

*Primary Examiner*—Carlton R. Croyle
*Assistant Examiner*—L. J. Casaregola
*Attorney, Agent, or Firm*—Ralph B. Pastoriza

[57] ABSTRACT

A variable volume chamber such as defined by a cylinder and piston has closed circuit connections to a given gas and a given liquid for which the gas has a chemical affinity when in physical contact therewith. By bringing the liquid and gas together in the confines of the closed chamber, the rapid absorption of the gas creates a vacuum or implosion effect which results in the piston being driven by the pressure differential further into the cylinder. The same process can be used to drive a rotary engine, there being required no heat, ignition system, or exhaust to the atmosphere of gas.

2 Claims, 3 Drawing Figures

IMPLOSION ENGINE

This invention relates generally to engines and more particularly to an implosion type engine which takes advantage of chemical and physical characteristics of certain gases and liquids for generating mechanical power.

BACKGROUND OF THE INVENTION

Conventional internal combustion engines all operate on the principle of explosions or rapid expansion of a burning fuel-air mixture. Such engines are relatively complicated in that they require carburetors or equivalent means for mixing the fuel and air, ignition means for igniting the fuel, and an exhaust to the atmosphere of burnt gases which are often poisonous and contribute substantially to air pollution.

It would obviously be desirable to provide an engine capable of generating equivalent mechanical power to conventional combustion engines but wherein mixing of fuel, igniting the same, and exhausting burnt fuel to the atmosphere could be wholly avoided. A method and structural apparatus capable of carrying out the method of such an operation, however, is by no means obvious.

BRIEF DESCRIPTION OF THE PRESENT INVENTION

With the foregoing in mind, the present invention contemplates a method and engine for carrying out the method of effecting mechanical movement; that is, generating mechanical power which wholly avoids the heretofore mentioned problems as well as many other problems associated with conventional internal combustion engines.

Briefly, the present invention operates basically on the principle of gaseous expansion and "implosion" rather than explosion. Essential, the basic method of the use of implosion in the invention provides mechanical movement capable of doing work of a member or element defining part of a closed chamber wherein such member is free to move in a direction to decrease the volume of the chamber. The basic method steps involved include: providing a source of a given gas; providing a source of a given liquid for which the gas has a chemical affinity when in physical contact therewith; and bringing the gas and liquid into physical contact with each other in the closed chamber to thereby create a reduction in pressure in the closed chamber as a result of absorption of the gas in the liquid whereby the member is moved in a direction to decrease the volume of the chamber. In its simplest form, the movement of the member is a consequence of the differential pressure acting thereon in conjunction with the vacuum created in response to the implosion within the chamber.

A simple engine for carrying out the method can take the form of cylinders and pistons, rotary type engines incoporating movable vanes or turbine type engines.

BRIEF DESCRIPTION OF THE DRAWINGS

A better understanding of the invention will be had by now referring to the accompanying drawings in which.

DETAILED DESCRIPTION OF THE INVENTION

Figure 1:
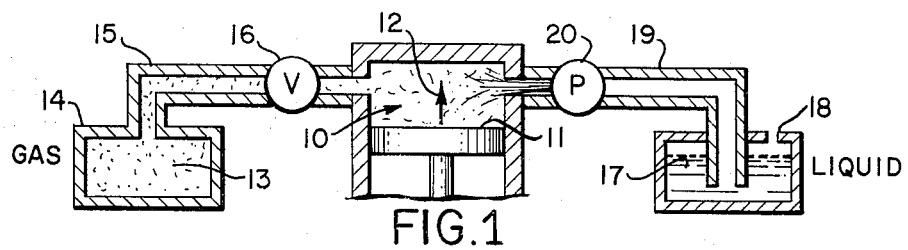
FIG. 1 is a diagramatic illustration of basic components useful in explaining the basic principles of the present invention.

Referring first to FIG. 1 there is shown a closed chamber 10 part of which constitutes a movable member 11 which might, for example, constitute a piston. The member 11 is free to move in the direction of the arrow 12 to decrease the volume of the chamber.

A given gas 13 is held in a container 14 and arranged to be introduced into the chamber 10 by way of passage 15 and valve 16. Similarly, a given liquid 17 for which the gas 13 has a chemical affinity is held in a container 18 and arranged to be introduced into the chamber 10 by way of passage 19 and a pump 20.

When the gas and liquid are brought into physical contact with each other, an extremely rapid absorption of the gas into the liquid takes place resulting in an implosion. Thus, by mixing the gas and liquid in a closed chamber such as 10, there is created a virtual vacuum so that the movable member 11 is driven by the exterior ambient pressure in the direction of the arrow 12.

In order that the gas be available for a practical period of time, it is preferable to use a gas capable of being held as a liquid under a reasonable pressure; for example, 2 to 20 atmospheres. Further, the particular liquid should have a relatively high vapor pressure so that it will stay in a liquid state under reduced pressures at normal temperatures; for example, down to at least 1/10 of an atmosphere. Finally, it is important that the absorption of the gas take place rapidly in order to create the implosion effect; for example, a liter of such gas should be completely absorbed in no less than 2 milliseconds.

In the preferred embodiment of the present invention, ammonia and water are used as the gas and liquid. These ingredients more than satisfy the foregoing requirements and both are plentiful. The chemical reacion is as follows:

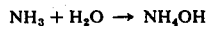

$$NH_3 + H_2O \rightarrow NH_4OH$$

The resulting ammonium hydroxide can be heated to separate the ammonia from the water and these ingredients then recycled and used again.

Figure 2:
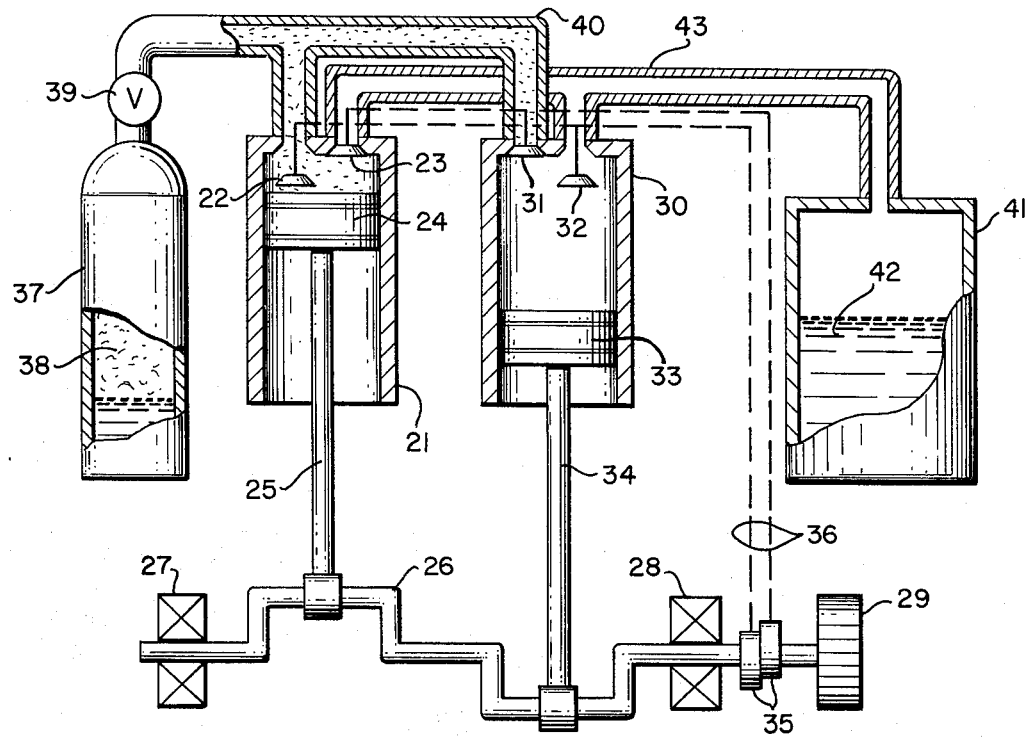
FIG. 2 is a schematic drawing partly in cross-section of a basic type of cylinder and piston engine operable in accord with the method of the present invention.

Referring now to FIG. 2, there is shown a simplified piston engine which may be operated in accord with the principles of the present invention. Thus, there is provided a cylinder 21 having inlet and outlet valves 22 and 23 and a piston 24 movable back and forth in the cylinder. The piston 24 is connected by a piston rod 25 to a crank shaft 26. Crank shaft 26 in turn is supported for rotation by bearing blocks 27 and 28 and includes a power take off gear 29.

In the example shown, there is provided a second cylinder 30 having inlet and outlet valves 31 and 32 and a piston 33 similarly connected as by piston rod 34 to the crank shaft 26. The inlet and outlet valves are controlled by lifting cams 35 on the crank shaft 26, as indicated by the dashed lines 36.

A closed gas system includes a container 37 holding a given gas such as ammonia under pressure as indicated at 38. By providing sufficient pressure, the gas 38 may be held in a liquid state so that a plentiful supply is available. As shown, the container 37 connects through a valve 39 and tubing 40 to the inlet valves of each of the cylinders.

A closed liquid system includes a liquid container 41 for holding the given liquid 42, such as water and connects as by tubing 43 to the outlet valves of each of the cylinders.

It will be noted in FIG. 2 that the cylinders 21 and 30 are essentially connected in parallel between the gas and liquid sources. It will be evident, of course, that additional cylinder and piston arrangements could be provided similarly having their inlet valves connected to the source of gas and their outlet valves connected to the liquid reservoir. Alternatively, only a single cylinder and piston arrangement is necessary to provide a workable engine.

In the operation of the engine of FIG. 2, the ammonia gas from the container 37 is supplied under control of the valve 39 to the inlet valves of the cylinders. The actuation of the valves by the lifting cams on the crank shaft is such that the inlet valve is opened and the outlet valve closed when the piston is at a first position closest to the cylinder head wherein the volume defined between the piston and cylinder head is a minimum. The inlet valve is closed and the outlet valve opened when the piston is at a second position furthest from the cylinder heads wherein the volume defined between the piston and cylinder head is a maximum. In FIG. 2, the piston 24 in the cylinder 21 is shown in its first position wherein the inlet valve 22 is opened and the outlet valve 23 closed while the piston 33 in the cylinder 30 is shown in its second position wherein the inlet valve is closed and the outlet valve opened.

Considering first the operation of the cylinder 21 and piston 24, in the first position shown, the ammonia gas 38 will pass through the inlet valve 22 under pressure to drive the piston 24 downwardly. When the piston reaches its second lowermost position, the closing of the inlet valve 22 and opening of the outlet valve 23 will expose the ammonia gas to the water 42 in the reservoir 41 through the tubing 43 and immediate absorption of the gas will take place thereby creating almost a complete vacuum in the cylinder. The exterior ambient air pressure will thus drive the piston upwardly to its first position and when it reaches this first position the outlet valve 23 will close and the inlet valve 22 open and the cycle will be repeated.

The piston 33 is 180° out of phase with the piston 24 and as shown in FIG. 2 is in its second position when the piston 24 is in its first position. Thus, while the piston 24 is being driven downwardly by the pressure of the ammonia gas, the piston 33 is being driven upwardly by the exterior ambient air pressure.

Figure 3:
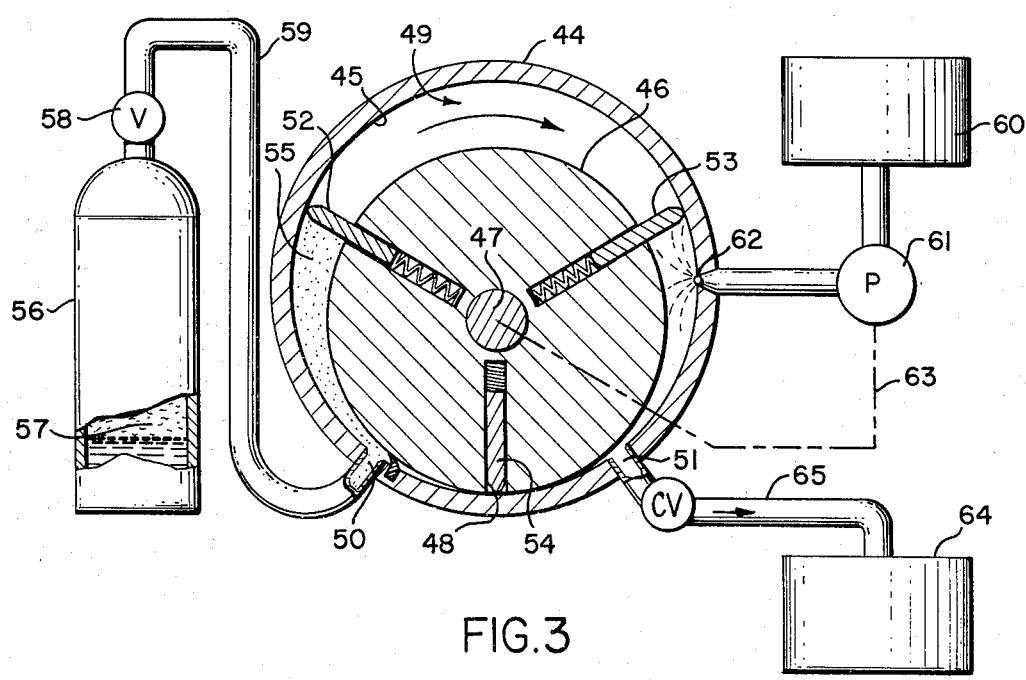
FIG. 3 is a basic diagram, partly in cross-section of a rotary type engine operable in accord with the principles of the present invention.

Referring now to FIG. 3, there is illustrated a rotary type engine which may be operated in accord with the principles of the present invention. As shown, the engine includes a stator body 44 having an inner wall 45 defining an annular cavity. A rotor body 46 of diameter smaller than the diameter of the annular cavity is eccentrically mounted in the cavity to be tangent to the inner wall 45 at one point as indicated at 48. A closed volume 49 secured by a seal is thus defined between the inner wall 45 and the periphery of the rotor body.

An inlet passage 50 adjacent to one side of the point of tangency 48 communicates with this inner volume. Similarly, an outlet passage 51 communicating with the closed volume is disposed adjacent to the other side of the point of tangency 48.

A movable vane means which may constitute one or more vanes is carried by the rotor and extends from the periphery to the inner wall so that closed volumes are defined between the opposite sides of the vane means and the point of tangency.

In the specific embodiment illustrated in FIG. 3, there are provided three vanes 52, 53 and 54 spaced at 120° and spring-biased outwardly so that their ends will remain in engagement with the inner wall 45 for all rotative positions of the rotor 46. In the specific position illustrated, there is thus defined a closed volume 55 between one side of the vane 52 and the point of tangency 48.

A pressurized source of gas in the form of a pressure container 56 filled with liquid ammonia 57 connects through control valve 58 and tubing 59 to the inlet passage 50. A source of liquid such as water is held in a container 60 and is periodically injected into the stator by pump means 61 and nozzle 62. As indicated by the dashed line 63, actuation of the pump 61 can be synchronized to inject the spray whenever the rotor shaft 47 reaches a given rotational position.

The engine of FIG. 3 is completed by the provision of a reservoir tank 64 connected by tubing 65 to the check valve at the outlet passage 51 for collecting liquid containing the absorbed gas.

In the operation of the engine of FIG. 3, in the position illustrated, gas under pressure is passed through the tubing 59 to the inlet passage 50 thereby exerting a force on the vane 52 to cause a clockwise rotation of the rotor. This driving of the rotor by pressure acting on the vane will continue as the rotor rotates, the next vane 54 after passing the inlet passage 50 similarly being subjected to this pressure.

The annular volume or space defined between successive vanes reaches a maximum and then starts to decrease. For example, the volume between the vanes 52 and 53 in the position shown in FIG. 3 is at a maximum and further rotation of the rotor in a clockwise direction will cause this volume to start to decrease.

By now injecting water spray from the nozzle 62 into the decreased volume, the gas therein will immediately be absorbed by the water thereby resulting in an implosion which increases greatly the pressure differential across the vane thereby providing further driving force for the rotor. The water with absorbed ammonia gas therein is collected at the outlet passage 51 in the reservoir tank 64, contained by the check valve.

As mentioned heretofore, the collected liquid with the absorbed gas in both of the engines of FIGS. 2 and 3 may be treated by a heating process to separate out the gas from the liquid and the same ingredients reused in the engine.

Several distinct advantages of the engines described in FIGS. 2 and 3 over conventional internal combustion engines will be evident. First, the engine may be economically manufactured. Heavy machinery is not required. In fact, plastic could be used for the engine. Second, many components associated with conventional engines are eliminated. For example, there is not required any type of explosive or combustible fuel and thus carburetion and ignition components can be eliminated. If the engine is used to drive a vehicle, the associated transmission and drive shaft can be eliminated, the speed of the engine being easily controlled by throttling the passage of the pressurized gas into the implosion chamber. Most importantly, the entire engine is a closed system there being no noxious fumes or exhaust. As a result, it can be operated under water or in other diverse environments, there being required no auxiliary equipment.

Other advantages accrue from the use of an implosion principle as opposed to a combustible or explosive fuel. Since substantially no heat is developed during the implosion or absorption process, there is no need for cooling systems. Moreover, the engine is relatively silent in operation since combustion of any type is eliminated. The engine in no way depends upon fossil fuels and its use thus solves both the problems of energy shortages and pollution. As mentioned, both ammonia and water are plentiful.

From the foregoing description, it will thus be evident that the present invention has provided a vastly improved method and apparatus for generating mechanical power.

What is claimed is:

1. An implosion engine including, in combination:
 a. a stator body having an inner wall defining an annular cavity of given diameter;
 b. a rotor body of diameter smaller than said given diameter eccentrically mounted in said cavity to be tangent to said inner wall at one point whereby a closed volume is defined between the inner wall and periphery of said rotor body, said stator body including an inlet passage adjacent to one side of said point of tangency communicating with said volume and an outlet passage adjacent to the other side of said point of tangency;
 c. at least one movable vane means extending from the periphery of said rotor to said inner wall to define a closed volume between one side of said vane means and said point of tangency;
 d. a closed gas system including a gas container holding a given gas under 2 to 20 atmospheres pressure connected to said inlet passage;
 e. a liquid container holding a given liquid for which said gas has a chemical affinity;
 f. pump means connected to said liquid container and to said stator body for introducing, upon actuation, a spray mist of liquid into the volume defined between the opposite side of said vane means and said point of tangency;
 g. means responsive to rotation of said rotor to a given position for actuating said pump means; and,
 h. a closed exhaust container connected to said outlet passage whereby said rotor is caused to rotate by gas under pressure passing into said inlet passage and acting against said one side of said vane means, the gas subsequently being subjected to a spray mist of said liquid when said rotor reaches said given position for actuating said pump means, said spray mist of liquid absorbing said gas to thereby create a vacuum in the volume defined between said other side of said vane means and said point of tangency thereby increasing the pressure differential across said vane means to cause continuous rotation of said rotor, water resulting from said mist with said absorbed gas therein being exhausted through said outlet passage to said exhaust container.

2. An implosion engine according to claim 1, in which said given gas is ammonia and said given liquid is water.

* * * * *